(No Model.)

J. L. PARKER.
KRAUT CUTTER.

No. 415,682. Patented Nov. 19, 1889.

Witnesses.
Ben W. Holden
Russell S. Hornor

Inventor.
James Lewis Parker
per W. B. Osborn
Attorney.

UNITED STATES PATENT OFFICE.

JAMES LEWIS PARKER, OF CLARKSBURG, WEST VIRGINIA.

KRAUT-CUTTER.

SPECIFICATION forming part of Letters Patent No. 415,682, dated November 19, 1889.

Application filed June 6, 1889. Serial No. 313,321. (No model.)

*To all whom it may concern:*

Be it known that I, JAMES LEWIS PARKER, a citizen of the United States, residing at Clarksburg, in the county of Harrison and State of West Virginia, have invented an Improvement in Machines for Cutting Kraut and Slaw, of which the following is a specification.

My invention relates to an improvement in that class of kraut and slaw cutting machines in which a series of knives revolving in a vertical plane operate in conjunction with a feeder for pressing the cabbage against the knives; and the object of my improvement is to provide a simple and effective feed arrangement to operate the feeder automatically.

In practice the invention is combined with a feed-box having one end removed, a feeder working loosely therein, and a knife-head adapted to revolve past the open end of the box. The feed-box and base on which it is mounted are preferably made of wood, the latter having secured to it bearings for the knife-head shaft to revolve in. The knife-head is of the usual construction, consisting of a circular plate having radial or curved knives on its face and similar openings through it for the discharge of the slaw.

The feeder is operated automatically by mechanism that will hereinafter be more particularly described and claimed.

Figure 1:
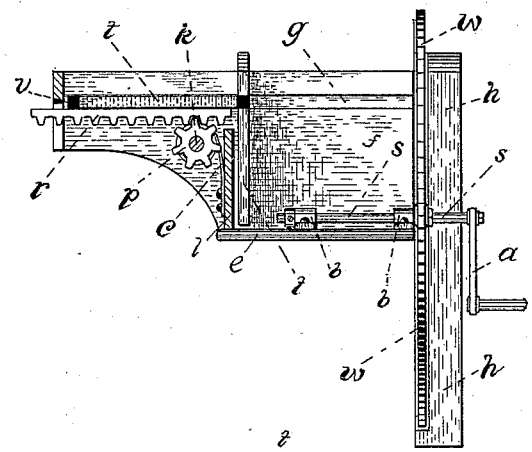
Figure 2:
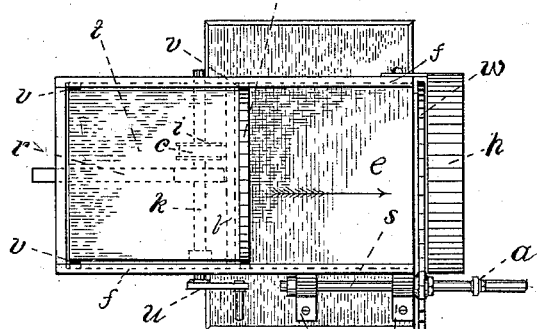
Figure 3:
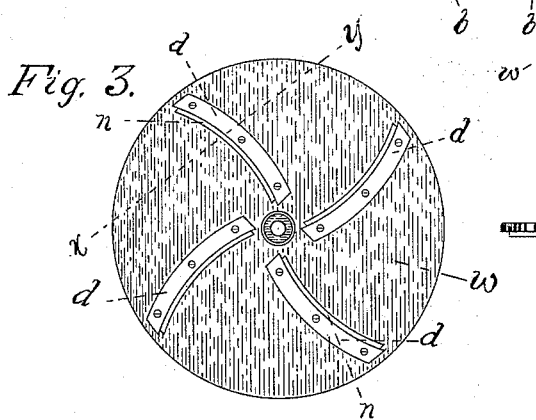
Figure 4:
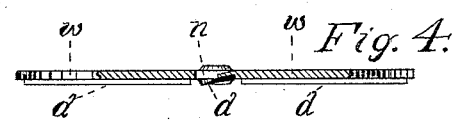

In the accompanying drawings, Figure 1 is an elevation of the machine with one side removed to expose to view its interior; Fig. 2, a plan of the entire machine; Fig. 3, a side or face view of the knife-head, showing the arrangement of the knives; and Fig. 4, a section on line X Y of Fig. 3.

Similar letters refer to similar parts throughout the several views.

$e$ is the base-plate of the machine; $ff$, sides of the feed-box, having grooves $g$ $g$ near the top, in which the feeder slides.

$t$ is the feeder, which consists of a flat plate adapted to slide in the grooves $g$ $g$, and having a vertical face which comes in contact with the cabbage and forces it against the knives $d$.

$l$ is a partition in the feed-box, which serves as a stop for the feeder and also has attached to it one end of the helical spring $c$.

$w$ is the knife-head having curved knives $d$ bolted to its face, and openings $n$ through it for the discharge of the slaw.

$s$ is a shaft on which the knife-head is securely fastened, and $b$ $b$ bearings on the base-plate in which it is journaled.

$a$ is a hand-crank on the outer end of shaft $s$, by means of which the knife-head is revolved.

$h$ is a spout for delivering the slaw into vessels.

$r$ is a horizontal toothed rack secured to the feeder, into which the pinion $p$ meshes.

$k$ is a transverse shaft taking its bearings in the sides of the feed-box and having fastened to it the pinion $p$.

$u$ is a crank on the end of shaft $k$ and in convenient reach of the operator, by means of which the feeder may be worked by hand. The feeder is advanced automatically by the use of the helical spring $c$, which is coiled around the shaft $k$ with considerable initial tension and in such manner as to cause the feeder (by the intervention of the pinion $p$ and rack $r$) to move regularly toward the knives when the machine is at work.

Having thus described my improvement, what I claim as new, and desire to secure by Letters Patent, is—

In a kraut and slaw cutter, the combination, with the feed-box having grooves in its sides and the feeder sliding in the grooves, of the toothed rack $r$, secured to the feeder, the shaft $k$, provided with the pinion $p$, the partition $l$, the spring $c$, secured at one end to the partition and coiled at the other end around the shaft $k$, the shaft $s$, the cutter-head $w$, mounted on said shaft and provided with the knives $d$, and means for revolving the shaft, all substantially as described.

JAMES LEWIS PARKER.

Witnesses:
BEN. W. HOLDEN,
RUSSELL S. HORNOR.